(12) United States Patent
Kim et al.

(10) Patent No.: US 10,811,661 B2
(45) Date of Patent: Oct. 20, 2020

(54) BATTERY SEPARATOR COMPRISING HYDROFLUORIC ACID REDUCTION MATERIAL

(71) Applicant: LG CHEM, LTD., Seoul (KR)

(72) Inventors: Min Ji Kim, Daejeon (KR); Min Ji Gu, Daejeon (KR); Kwan Woo Nam, Daejeon (KR); Min Hyung Kim, Daejeon (KR); Je An Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 27 days.

(21) Appl. No.: 16/463,798

(22) PCT Filed: Jul. 24, 2018

(86) PCT No.: PCT/KR2018/008357
§ 371 (c)(1),
(2) Date: May 23, 2019

(87) PCT Pub. No.: WO2019/022474
PCT Pub. Date: Jan. 31, 2019

(65) Prior Publication Data
US 2019/0288261 A1    Sep. 19, 2019

(30) Foreign Application Priority Data

Jul. 25, 2017 (KR) ........................ 10-2017-0094377

(51) Int. Cl.
*H01M 4/02* (2006.01)
*H01M 2/16* (2006.01)
(Continued)

(52) U.S. Cl.
CPC ......... *H01M 2/1686* (2013.01); *H01M 2/145* (2013.01); *H01M 2/16* (2013.01);
(Continued)

(58) Field of Classification Search
CPC ...................................................... H01M 4/02
See application file for complete search history.

(56) References Cited

U.S. PATENT DOCUMENTS 7,662,517 B2   2/2010   Lee et al.
8,927,134 B2   1/2015   Yu et al.
(Continued)

FOREIGN PATENT DOCUMENTS

JP       4606705 B2       1/2011
JP       2014-179206 A    9/2014
(Continued)

OTHER PUBLICATIONS

Extended European Search Report for European Application No. 18838172.7, dated Nov. 13, 2019.
(Continued)

*Primary Examiner* — Jacob B Marks
(74) *Attorney, Agent, or Firm* — Birch, Stewart, Kolasch & Birch, LLP

(57) ABSTRACT

A separator including a polyolefin-based separator substrate having a porous structure, a first coating portion including a mixture of inorganic particles and a binder polymer, and a second coating portion including a material that reduces generation of hydrofluoric acid, wherein the first coating portion and the second coating portion are located on the separator substrate, are located in pores in the separator substrate, or are located on the separator substrate and in pores in the separator substrate.

16 Claims, 2 Drawing Sheets

(51) Int. Cl.
  *H01M 2/14* (2006.01)
  *H01M 2/34* (2006.01)
  *H01M 4/62* (2006.01)
  *H01M 10/052* (2010.01)
  *H01M 10/056* (2010.01)
  *H01M 10/42* (2006.01)

(52) U.S. Cl.
  CPC ....... *H01M 2/1646* (2013.01); *H01M 2/1653* (2013.01); *H01M 2/1673* (2013.01); *H01M 2/345* (2013.01); *H01M 4/622* (2013.01); *H01M 10/052* (2013.01); *H01M 10/056* (2013.01); *H01M 10/42* (2013.01); *H01M 10/4235* (2013.01); *H01M 2200/20* (2013.01)

(56) References Cited

U.S. PATENT DOCUMENTS

| | | |
|---|---|---|
| 2003/0072999 A1 | 4/2003 | Birke et al. |
| 2006/0008700 A1 | 1/2006 | Yong et al. |
| 2009/0111025 A1 | 4/2009 | Lee et al. |
| 2013/0149587 A1 | 6/2013 | Yu et al. |
| 2015/0086714 A1 | 3/2015 | Yu et al. |
| 2017/0229743 A1* | 8/2017 | Ito .................... H01M 10/0567 |

FOREIGN PATENT DOCUMENTS

| | | |
|---|---|---|
| KR | 10-0775310 B1 | 11/2007 |
| KR | 10-0877161 B1 | 1/2009 |
| KR | 10-1358761 B1 | 2/2014 |
| KR | 10-1442958 B1 | 9/2014 |
| KR | 10-2015-0099648 A | 9/2015 |
| KR | 10-1723994 B1 | 4/2017 |

OTHER PUBLICATIONS

International Search Report for PCT/KR2018/008357 (PCT/ISA/210) dated Oct. 29, 2018, with English translation.

* cited by examiner

【FIG. 1】
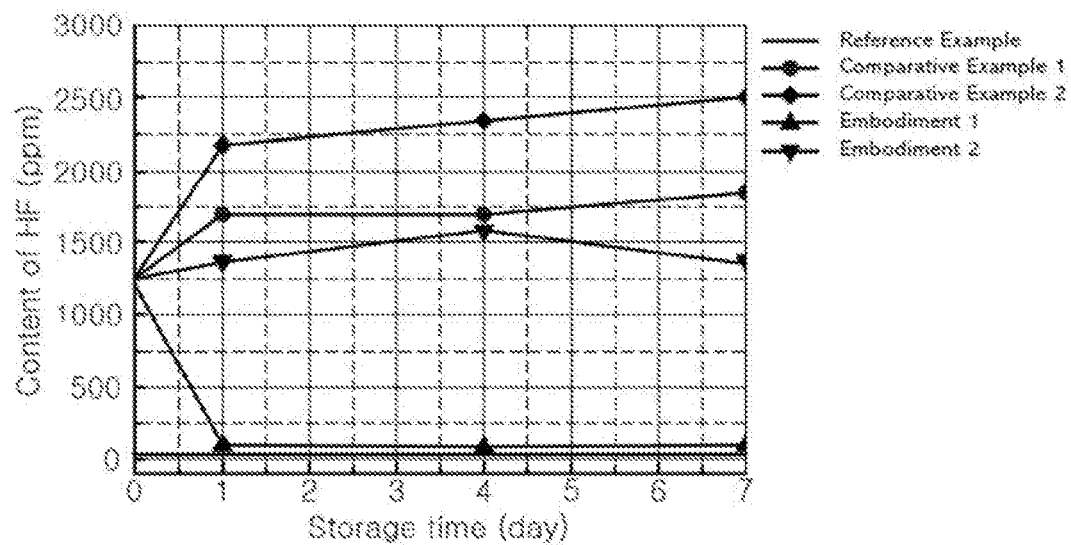
【FIG. 2】
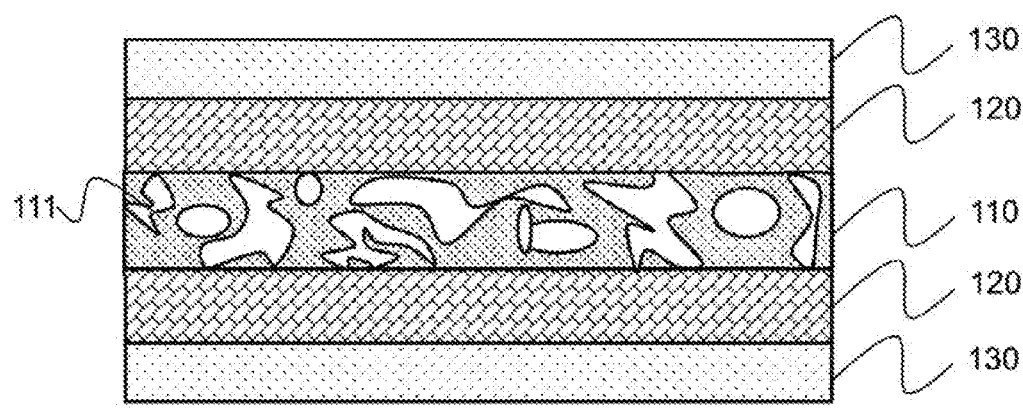

[FIG. 3]
200
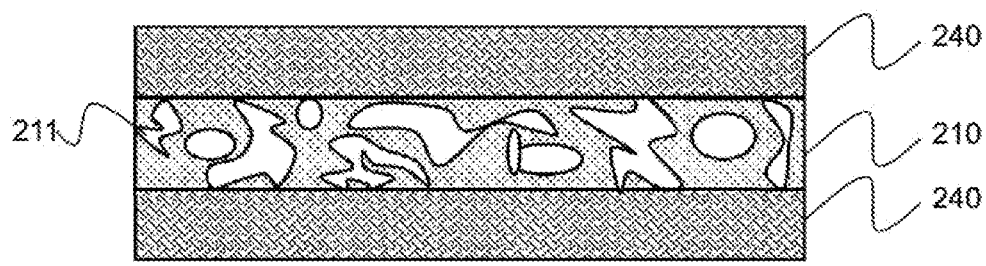
[FIG. 4]
300
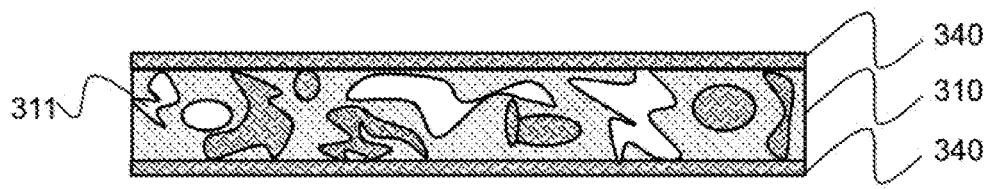

BATTERY SEPARATOR COMPRISING HYDROFLUORIC ACID REDUCTION MATERIAL

TECHNICAL FIELD

This application claims the benefit of Korean Patent Application No. 2017-0094377 filed on Jul. 25, 2017 with the Korean Intellectual Property Office, the disclosure of which is herein incorporated by reference in its entirety.

The present invention relates to a battery separator including a hydrofluoric acid reduction material, and more particularly to a separator for secondary batteries including a material for preventing the generation of hydrofluoric acid provided on the surface of a polyolefin-based separator substrate configured to have a porous structure or in pores formed in the separator substrate in order to prevent a reduction in the capacity of a battery.

BACKGROUND ART

As portable devices, such as a portable computer, a mobile telephone, and a camera, have been increasingly developed and the demand for such portable devices has increased, the demand for secondary batteries as energy sources for such portable devices has also sharply increased. Among such secondary batteries is a lithium secondary battery having a high energy density, a high voltage, a long lifespan, and a low self discharge rate, into which much research has been carried out and which is now commercialized and widely used.

To date, a polyolefin-based porous separator having a thickness ranging from about 5 to about 30 μm has been used as a separator for isolating a positive electrode and a negative electrode of a lithium secondary battery from each other. In the case in which the polyolefin-based porous separator ruptures due to dendrite growth in the battery, the separator may induce explosion of the battery due to an internal short circuit. In order to restrain such instability of the battery, inorganic particles and a binder may be coated on one or both surfaces of a porous separator substrate such that the inorganic particles restrain the shrinkage of the substrate, whereby the safety of the separator is further guaranteed by the inorganic coating layer.

The coated separator is manufactured by dispersing an aluminum oxide in an oil-phase solution or an aqueous solution. The content of moisture in the battery may be increased due to the affinity for moisture of the aluminum oxide. The moisture in the battery reacts with lithium salt in an organic electrolytic solution, such as $LiPF_6$, to generate hydrogen fluoride (HF). HF destroys an SEI layer and accelerates elution from a positive electrode, with the result that the safety and durability of the battery are greatly reduced. In particular, since HF accelerates the decomposition of the battery at a high temperature, secondary batteries for electric vehicles, which are operated at higher temperatures than those of general portable devices, may be further greatly affected.

In order to solve the above-described problem, Korean Registered Patent No. 10-1442958 discloses an organic/inorganic composite multi-functional coating separator consisting of a coating solution, including multi-functional particles $Ba_xSi_yO_z$ ($0<x<1$, $0<y<1$, $x+2y=x$) and an organic binder, and a separator substrate.

This technology uses multi-functional particles, which reduce the content of moisture and thus restrain the generation of HF. However, it is not possible to remove the generated HF.

Korean Registered Patent No. 10-0775310 discloses an organic/inorganic composite porous separator including an active layer, which is a mixture of inorganic particles and a binder polymer, coated on a polyolefin-based porous separator substrate.

This technology uses a porous separator substrate in order to improve lithium ion conductivity and an electrolyte impregnation rate. However, this technology does not suggest a function of reducing the content of hydrofluoric acid.

Japanese Registered Patent No. 4606705, which is another example of the conventional art, relates to a separator for secondary batteries, which is manufactured by mixing glass including a silicon dioxide component with an organic polymer.

Japanese Registered Patent No. 4606705 discloses a separator manufactured by mixing with a silicon dioxide, rather than a separator as a separate member. As a result, the electrolyte impregnation rate is greatly reduced, compared to the case in which the separator includes a porous separator substrate and a mixture layer.

Korean Registered Patent No. 10-17239974 discloses a separator including a substrate, on the surface of which a coating layer including inorganic particles having reactive functional groups located on the surfaces thereof is located.

This technology suggests only a method of improving the impregnation property and ion conductivity of an electrolytic solution. However, this technology does not disclose a method of removing hydrofluoric acid, which reduces the lifespan of a secondary battery.

Therefore, there is a strong necessity for a separator containing a component that is capable of reacting with hydrofluoric acid that is generated in order to directly reduce the content of the hydrofluoric acid while having a high electrolyte impregnation rate.

DISCLOSURE

Technical Problem

The present invention has been made in view of the above problems, and it is an object of the present invention to provide a separator configured such that a first coating portion, including a mixture of inorganic particles and a binder polymer, and a second coating portion, including a material for preventing the generation of hydrofluoric acid, are located on a separator substrate configured to have a porous structure or are located in pores formed in the separator substrate.

In addition, since a material for preventing the generation of hydrofluoric acid is included, it is possible to restrain the destruction of an SEI layer and thus to prevent a decrease in the capacity of a battery cell.

Technical Solution

In accordance with an aspect of the present invention, the above and other objects can be accomplished by the provision of a separator including a polyolefin-based separator substrate having a porous structure, a first coating portion including a mixture of inorganic particles and a binder polymer, and a second coating portion including a material that reduces generation of hydrofluoric acid, wherein the first coating portion and the second coating portion are located on the separator substrate, are located in pores in the separator substrate, or are located on the separator substrate and in pores in the separator substrate.

As described above, the separator according to the present invention is configured to have a structure in which a first coating portion, including a mixture of inorganic particles and a binder polymer, and a second coating portion, including a material for preventing the generation of hydrofluoric acid, are located on a separator substrate configured to have a porous structure or are located in pores formed in the separator substrate, whereby it is possible to improve lithium ion conductivity and an electrolyte impregnation rate.

In addition, since a material for preventing the generation of hydrofluoric acid, which destroys an SEI layer and thus reduces the lifespan and capacity of a battery, is included, it is possible to prevent a decrease in the lifespan and capacity of the battery.

In a concrete example, the separator according to the present invention may be configured to have a structure in which the first coating portion is located on the separator substrate and in which the second coating portion is located on the first coating portion.

As described above, the separator may have a structure in which the separator substrate, the first coating portion, and the second coating portion are stacked. The separator substrate, the first coating portion, and the second coating portion may be joined to each other while maintaining their inherent properties. Alternatively, the separator substrate and the first coating portion may be mixed with each other at the boundary therebetween, and/or the first coating portion and the second coating portion may be mixed with each other at the boundary therebetween.

In another concrete example, the separator according to the present invention may have a mixed layer, including the first coating portion and the second coating portion in a mixed state, located on the separator substrate. That is, a mixed layer, including the first coating portion and the second coating portion in a mixed state, may be located on the polyolefin-based separator substrate having the porous structure, unlike a layered structure in which the first coating portion and the second coating portion are provided as separated layers.

The first coating portion and the second coating portion may be separately formed and then mixed with each other in order to manufacture the mixed layer. In the case in which compounds constituting the first coating portion and the second coating portion do not chemically react with each other, the formation of the first coating portion and the second coating portion and the manufacture of the mixed layer may be simultaneously performed.

The second coating portion may account for 5 to 95 weight % or 10 to 90 weight %, preferably 30 to 70 weight %, based on a total weight of the mixed layer.

In the case in which the second coating portion accounts for less than 10 weight % based on the total weight of the mixed layer, it is difficult to sufficiently achieve the effect of preventing the generation of hydrofluoric acid. In the case in which the second coating portion accounts for greater than 90 weight % based on the total weight of the mixed layer, the electrolyte impregnation rate may be reduced, or it may be difficult to guarantee sufficient strength of the separator.

In another embodiment, the mixed layer may be located in at least a portion of the pores in the separator substrate. The material for preventing the generation of the hydrofluoric acid may be located in the pores formed in the separator substrate. Even in the case in which HF is formed in the separator substrate impregnated with the electrolytic solution, therefore, it is possible to rapidly remove the formed HF, since the material for preventing the generation of the hydrofluoric acid is included in the pores formed in the separator substrate.

In the structure in which the first coating portion and the second coating portion are provided separately, and also in the structure in which the first coating portion and the second coating portion are mixed, the content of the second coating portion may be uniform. For example, the material that reduces generation of hydrofluoric acid accounts is present in an amount of 70 to 100 weight %, preferably 80 to 100 weight %, based on a total amount of a solid content of the second coating portion.

In the case in which the content of the material that reduces generation of the hydrofluoric acid is less than 70 weight % of the total amount of the solid content of the second coating portion, the hydrofluoric acid removal time is increased or the hydrofluoric acid removal efficiency is decreased, which is undesirable.

The material that reduces generation of hydrofluoric acid may be a material including $SiO_2$. Specifically, the material including $SiO_2$ may be glass including $SiO_2$.

In addition, the material for preventing the generation of hydrofluoric acid may be sodium carbonate ($Na_2CO_3$) or calcium carbonate ($K_2CO_3$), which may react with the hydrofluoric acid in order to remove the hydrofluoric acid as follows.

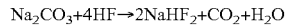

$Na_2CO_3 + 4HF \rightarrow 2NaHF_2 + CO_2 + H_2O$

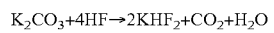

$K_2CO_3 + 4HF \rightarrow 2KHF_2 + CO_2 + H_2O$

The inorganic particles that constitute the first coating portion may be at least one selected from the group consisting of (a) inorganic particles having a dielectric constant of 5 or more, (b) inorganic particles having piezoelectricity, and (c) inorganic particles having lithium ion transmission capability.

The (a) inorganic particles having a dielectric constant of 5 or more may be $SrTiO_3$, $SnO_2$, $CeO_2$, MgO, NiO, CaO, ZnO, $ZrO_2$, $Y_2O_3$, $Al_2O_3$, $TiO_2$, or SiC.

The (b) inorganic particles having piezoelectricity may be configured to form a potential difference due to a positive charge and a negative charge generated between opposite surfaces of the particles when a predetermined level of pressure is applied thereto, and may be at least one selected from the group consisting of $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, and a mixture thereof.

The (c) inorganic particles having lithium ion transmission capability may be configured to contain lithium elements but to move lithium ions, rather than to store lithium, and may be at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$-based glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$-based glass ($Li_xSi_yS_z$, $0<x<3$, $0<y<2$, $0<z<4$) such as $Li_3PO_4$—$Li_2S$—$SiS_2$, $P_2S_5$-based glass ($Li_xP_yS_z$, $0<x<3$, $0<y<3$, $0<z<7$) such as LiI—$Li_2S$—$P_2S_5$, and a mixture thereof.

The binder polymer, which constitutes the first coating portion, may be at least one selected from the group consisting of polyvinylidene fluoride-co-hexafluoropropylene, polyvinylidene fluoride-co-trichloroethylene, polymethyl methacrylate, polyacrylonitrile, polyvinylpyrrolidone, polyvinyl acetate, polyethylene-co-vinyl acetate, polyimide, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxyl methyl cellulose, and polyvinyl alcohol.

The polyolefin-based separator substrate having the porous structure may include at least one selected from the group consisting of high-density polyethylene, low-density polyethylene, linear low-density polyethylene, ultrahigh-molecular-weight polyethylene, and polypropylene.

In accordance with another aspect of the present invention, there is provided a secondary battery including the separator. The secondary battery is configured to have a structure in which the separator is interposed between a positive electrode and a negative electrode.

The positive electrode may be manufactured by applying a mixture of a positive electrode active material, a conductive agent, and a binder to a positive electrode current collector and drying the mixture. A filler may be further added to the mixture as needed.

In general, the positive electrode current collector is manufactured so as to have a thickness of 3 to 500 μm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or plastic carbon. Alternatively, the positive electrode current collector may be made of aluminum or stainless steel, the surface of which is treated with carbon, nickel, titanium, or silver. In addition, the positive electrode current collector may have a micro-scale uneven pattern formed on the surface thereof so as to increase the force of adhesion of the positive electrode active material. The positive electrode current collector may be configured in various forms, such as those of a film, a sheet, a foil, a net, a porous body, a foam body, and a non-woven fabric body.

The positive electrode active material may be, but is not limited to, a layered compound, such as a lithium cobalt oxide ($LiCoO_2$) or a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiV_3O_4$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent accounts for 1 to 30 weight % based on the total weight of the compound including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive materials, such as polyphenylene derivatives, may be used as the conductive agent.

The binder, which is included in the positive electrode, is a component assisting in binding between the active material and the conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler, as long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

The negative electrode may be manufactured by applying a negative electrode material to a negative electrode current collector and drying the same. The above-described components may be selectively further included as needed.

In general, the negative electrode current collector is manufactured so as to have a thickness of 3 to 500 μm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of the negative electrode active material, in the same manner as the positive electrode current collector. The negative electrode current collector may be configured in various forms, such as those of a film, a sheet, a foil, a net, a porous body, a foam body, and a non-woven fabric body.

As the negative electrode active material, for example, there may be used carbon, such as a non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0<x\leq1$; $1\leq y\leq3$; $1\leq z\leq8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

In accordance with a further aspect of the present invention, there is provided a battery pack including the secondary battery.

Specifically, the battery pack may be used as a power source for a device requiring the ability to withstand high temperatures, a long lifespan, high rate characteristics, etc. Specific examples of the device may include a mobile electronic device, a wearable electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and a power storage system. However, the present invention is not limited thereto.

The structure and manufacturing method of the device are well known in the art to which the present invention pertains, and a detailed description thereof will be omitted.

BRIEF DESCRIPTION OF DRAWINGS

FIG. 1 is a graph showing the content of HF over time.

FIG. 2 is a vertical sectional view showing a separator according to an embodiment of the present invention.

FIG. 3 is a vertical sectional view showing a separator according to another embodiment of the present invention.

FIG. 4 is a vertical sectional view showing a separator according to a further embodiment of the present invention.

BEST MODE

Now, the present invention will be described with reference to embodiments of the present invention. It should be noted, however, that the illustrated embodiments are given for easier understanding of the present invention, and thus the scope of the present invention is not limited by the illustrated embodiments.

Embodiment 1

Manufacture of Separator

About 10 weight % of polyvinylidene fluoride-hexafluoropropylene copolymer (PVdF-HFP) was added to acetone, and was dissolved at a temperature of 60° C. for about 12 hours or more in order to manufacture a polymer solution. $Al_2O_3$ powder was added to the polymer solution such that the ratio of $Al_2O_3$/PVdF-HFP was 80/20 (weight %), and the $Al_2O_3$ powder was dispersed for 2 hours or more using a ball mill method in order to manufacture first slurry. The manufactured first slurry was coated on a polyethylene separator using a dip-coating method.

About 10 weight % of polyvinylidene fluoride-hexafluoropropylene copolymer (PVdF-HFP) was added to acetone, and was dissolved at a temperature of 60° C. for about 12 hours or more in order to manufacture a polymer solution. $SiO_2$ powder was added to the polymer solution such that the ratio of $SiO_2$/PVdF-HFP was 80/20 (weight %), and the $SiO_2$ powder was dispersed for 2 hours or more using a ball mill method in order to manufacture second slurry. The manufactured second slurry was coated on the first slurry, which was coated on the polyethylene separator, using a dip-coating method.

Manufacture of Electrolytic Solution 1,000 ppm of distilled water was poured into an electrolytic solution manufactured such that the ratio of ethylene carbonate (EC) having 1M of lithium hexafluorophosphate ($LiPF_6$) dissolved therein: ethyl methyl carbonate (EMC) was 3:7 (volume %), and the mixture was stored in an oven at a temperature of 60° C. for about 24 hours such that an excessive amount of HF was generated in the mixture.

The separator on which the first slurry was coated was impregnated with the HF-generated electrolytic solution, and variation in the content of HF was checked over 7 days.

Embodiment 2

Evaluation was performed using the same method as in Embodiment 1, except that mixed slurry including the first slurry and the second slurry in a mixed state was coated on the polyethylene separator. At this time, the ratio of $Al_2O_3$:$SiO_2$ was 95:5 (weight %).

Comparative Example 1

Evaluation was performed using the same method as in Embodiment 1, except that neither first slurry nor second slurry was coated in Embodiment 1.

Comparative Example 2

Evaluation was performed using the same method as in Embodiment 1, except that no second slurry was coated in Embodiment 1.

Reference Example

A secondary battery was manufactured using the same method as in Embodiment 1, except that 1,000 ppm of distilled water was not added to the electrolytic solution in Embodiment 1.

Experimental Example 1

The secondary batteries, manufactured according to Embodiment 1, Embodiment 2, Comparative Example 1, Comparative Example 2, and Reference Example, were stored at a temperature of 25 for 7 days in order to measure the content of HF. The measurement results are shown in FIG. 1.

Referring to FIG. 1, in the case of Embodiment 1, in which the second slurry including $SiO_2$ was coated on the outermost layer of the separator, HF reacted with $SiO_2$ and was removed through the following process, compared to Reference Example, in which no distilled water was included in the electrolytic solution, whereby it was difficult to form HF. Consequently, Embodiment 1 had almost the same content of HF as in Reference Example. In the case of Embodiment 2, in which the mixed slurry, including the first slurry and the second slurry in the mixed state, was coated on the separator, the content of $SiO_2$ in the mixed slurry was reduced, compared to Embodiment 1, with the result that the initial content of HF was increased within narrow limits but started to decrease after the fourth day and decreased to a level similar to the initial level on the seventh day.

$$SiO_2 + 4HF \rightarrow SiF_4 + 2H_2O$$

$$SiO_2 + 6HF \rightarrow H_2(SiF_6) + 2H_2O$$

In the case of Comparative Examples 1 and 2, however, the content of HF was abruptly increased, since the distilled water included in the electrolytic solution reacted with lithium salt in the electrolytic solution. Specifically, in the case of Comparative Example 1, in which neither a first slurry layer including $Al_2O_3$ nor a second slurry layer including $SiO_2$ was included, the content of HF was abruptly increased to about 400 ppm on the first day of storage, remained almost uniform thereafter, increased gently after the fourth day, and increased to about 1,800 ppm on the seventh day. In the case of Comparative Example 2, in which no second slurry layer was included, the content of HF was abruptly increased to about 900 ppm on the first day of storage, remained almost uniform thereafter, and increased to about 2,300 ppm on the seventh day.

That is, since Comparative Examples 1 and 2 did not include $SiO_2$, which could remove HF, the content of HF was gradually increased over time. In the case of Comparative Example 2, the content of HF increased more rapidly over time due to the moisture included in $Al_2O_3$.

Hereinafter, preferred embodiments of the present invention will be described in detail with reference to the accompanying drawings. It should be noted, however, that the illustrated embodiments are given for easier understanding of the present invention, and thus the scope of the present invention is not limited by the illustrated embodiments.

FIG. 2 is a vertical sectional view schematically showing a separator according to an embodiment of the present invention.

Referring to FIG. 2, a separator 100 is configured such that first coating portions 120 are coated on the upper surface and the lower surface of a separator substrate 110 having open-type pores 111 formed therein and such that second coating portions 130 are coated on the outer surfaces of the first coating portions 120, which do not face the separator substrate 110. Although the state in which the first coating portion 120 and the second coating portion 130 are not included in the pores 111 is shown, the pores 111 may remain empty in order to improve an electrolyte impregnation rate, or the first coating portion 120 and/or the second coating portion 130 may be included in at least some of the pores 111.

In addition, although the state in which the first coating portions 120 are coated on the entireties of the opposite surfaces of the separator substrate 110 and in which the second coating portions 130 are coated on the entireties of the outer surfaces of the first coating portions 120 is shown, the first coating portions 120 may be coated on partial regions of the opposite surfaces of the separator substrate, and the second coating portions 120 are coated on partial regions of the outer surfaces of the first coating portions 120.

FIG. 3 is a vertical sectional view schematically showing a separator according to another embodiment of the present invention.

Referring to FIG. 3, a separator 200 is configured such that mixed layers 240, each of which includes a first coating portion and a second coating portion in a mixed state, are coated on the upper surface and the lower surface of a separator substrate 210 having open-type pores 211 formed therein.

Although the state in which the mixed layer 240 is not included in the pores 211 is shown, the pores 211 may remain empty in order to improve an electrolyte impregnation rate, or the mixed layer 240 may be included in at least some of the pores 111.

In addition, although the state in which the mixed layers 240 are coated on the entireties of the opposite surfaces of the separator substrate 210 is shown, the mixed layers 240 may be coated on partial regions of the opposite surfaces of the separator substrate.

FIG. 4 is a vertical sectional view schematically showing a separator according to a further embodiment of the present invention.

Referring to FIG. 4, open-type pores 311 are formed in a separator substrate 310, and a mixed layer 340, which includes a first coating portion and a second coating portion in a mixed state, is located in the pores.

The mixed layer 340 may be included in at least some of the pores 311, and a portion of the mixed layer may be provided on each of the upper surface and the lower surface of the separator substrate.

Those skilled in the art to which the present invention pertains will appreciate that various applications and modifications are possible based on the above description, without departing from the scope of the present invention.

INDUSTRIAL APPLICABILITY

As is apparent from the above description, the separator according to the present invention includes a separator substrate configured to have a porous structure, a first coating portion including a mixture of inorganic particles and a binder polymer, and a second coating portion including a material for preventing the generation of hydrofluoric acid, whereby lithium ion conductivity and an electrolyte impregnation rate are improved.

In addition, since a material for preventing the generation of hydrofluoric acid, which destroys an SEI layer and thus reduces the lifespan and capacity of a battery, is included, it is possible to remarkably reduce the occurrence of the problems described above.

DESCRIPTION OF REFERENCE NUMERALS 100, 200, 300: Separators
110, 210, 310: Separator substrates
111, 211, 311: Separator pores
120: First coating portions
130: Second coating portions
240, 340: Mixed layers

The invention claimed is:

1. A separator comprising:
   a polyolefin-based separator substrate having a porous structure;
   a first coating portion comprising a mixture of inorganic particles and a binder polymer; and
   a second coating portion comprising a material that reduces generation of hydrofluoric acid, wherein
   the first coating portion and the second coating portion are located on the separator substrate, are located in pores in the separator substrate, or are located on the separator substrate and in pores in the separator substrate.

2. The separator according to claim 1, wherein
   the first coating portion is located on the separator substrate, and
   the second coating portion is located on the first coating portion.

3. The separator according to claim 1, wherein a mixed layer, comprising the first coating portion and the second coating portion in a mixed state, is located on the separator substrate.

4. The separator according to claim 3, wherein the second coating portion is present in an amount of 5 to 95 weight % based on a total weight of the mixed layer.

5. The separator according to claim 3, wherein the mixed layer is located in at least a portion of the pores in the separator substrate in addition to being located on the separator substrate.

6. The separator according to claim 1, wherein the material that reduces generation of hydrofluoric acid is present in an amount of 70 to 100 weight % based on a total amount of a solid content of the second coating portion.

7. The separator according to claim 1, wherein the material that reduces generation of hydrofluoric acid is a material comprising $SiO_2$.

8. The separator according to claim 7, wherein the material comprising $SiO_2$ glass comprising $SiO_2$.

9. The separator according to claim 1 wherein the inorganic particles are at least one selected from a group consisting of (a) inorganic particles having a dielectric constant of 5 or more, (b) inorganic particles having piezoelectricity, and (c) inorganic particles haying lithium ion transmission capability.

10. The separator according to claim 9, wherein
the (a) inorganic particles having a dielectric constant of 5 or more, when present, are $SrTiO_3$, $SnO_2$, $CeO_2$, MgO, NiO, CaO, ZnO, $ZrO_2$, $Y_2O_3$, $Al_2O_3$, $TiO_2$, or SiC,
the (b) inorganic particles having piezoelectricity, when present form a potential difference due to a positive charge and a negative charge generated between opposite surfaces of the particles when a predetermined level of pressure is applied thereto, and are at least one selected from a group consisting of $BaTiO_3$, $Pb(Zr,Ti)O_3$ (PZT), lead lanthanum zirconate titanate (PLZT), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, and a mixture thereof, and
the (c) inorganic particles having lithium ion transmission capability, when present, contain lithium elements that move lithium ions, rather than store lithium, and are at least one selected from a group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$), $P_2S_5$-based glass ($Li_xP_yS_z$, $0<x<3$, $0<y<3$, $0<z<7$), and a mixture thereof.

11. The separator according to claim 1, wherein the binder polymer is at least one selected from a group consisting of polyvinylidene fluoride-co-hexafluoropropylene, polyvinylidene fluoride-co-trichloroethylene, polymethyl methacrylate, polyacrylonitrile, polyvinylpyrrolidone, polyvinyl acetate, polyethylene-co-vinyl acetate, polyimide, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxyl methyl cellulose, and polyvinyl alcohol.

12. The separator according to claim 1, wherein the polyolefin-based separator substrate comprises at least one selected from a group consisting of high-density polyethylene, low-density polyethylene, linear low-density polyethylene, ultrahigh-molecular-weight polyethylene, and polypropylene.

13. A secondary battery comprising the separator according claim 1.

14. The separator according to claim 1, wherein the material that reduces generation of hydrofluoric acid has a property of reacting with hydrofluoric acid to remove the hydrofluoric acid.

15. the separator according to claim 14, wherein the material that reduces generation of hydrofluoric acid is at least one selected from a group consisting of $SiO_2$, $Na_2CO_3$ and $K_2CO_3$.

16. The separator according to claim 3, wherein the second coating portion is present in an amount of 10 to 90 weight % based on a total weight of the mixed layer.

* * * * *